United States Patent [19]

Mueller

[11] Patent Number: 5,703,676
[45] Date of Patent: Dec. 30, 1997

[54] ZOOM LENS SYSTEM FOR A PHOTOGRAPHIC COPIER

[75] Inventor: Markus Mueller, Munich, Germany

[73] Assignee: Agfa-Gevaert AG, Leverkusen, Germany

[21] Appl. No.: 526,844

[22] Filed: Sep. 11, 1995

[30] Foreign Application Priority Data

Sep. 20, 1994 [DE] Germany .................. 44 33 532.6

[51] Int. Cl.⁶ ........................ G03B 27/54; G03B 27/40
[52] U.S. Cl. ........................ 355/56; 355/55; 355/57; 359/694; 359/704; 359/706; 359/811; 359/819
[58] Field of Search ................ 359/694–706, 359/813–814, 819–830; 355/56–57, 60

[56] References Cited

U.S. PATENT DOCUMENTS

| | | | |
|---|---|---|---|
| 5,038,168 | 8/1991 | Kurimoto et al. | 355/56 |
| 5,181,144 | 1/1993 | Shirie et al. | 259/700 |
| 5,257,065 | 10/1993 | Nagel . | |
| 5,272,567 | 12/1993 | Inoue | 359/696 |
| 5,337,187 | 8/1994 | Fukino et al. | 359/699 |
| 5,418,645 | 5/1995 | Coat et al. | 359/694 |

FOREIGN PATENT DOCUMENTS

| | | |
|---|---|---|
| 34 36 270 A1 | 4/1985 | Germany . |
| 31 40 841 C2 | 9/1991 | Germany . |

OTHER PUBLICATIONS

Photographs of prior art MSP1 objective of Agfa Gevaert AG, Munich, Germany 1 page, Figs. 1–5.

*Primary Examiner*—Arthur T. Grimley
*Assistant Examiner*—Shival Virmani
*Attorney, Agent, or Firm*—Darby & Darby

[57] ABSTRACT

A zoom objective for a photographic printer has a housing which accommodates two groups of lenses. One group is fixed and the other group is shiftable along the optical axis of the objective to change the magnification. The housing is externally threaded and meshes with an internally threaded magnification ring which surrounds the housing and serves to move the shiftable lens group. A clamping ring circumscribes the housing on either side of the magnification ring, and the clamping rings constitute abutments for the magnification ring. The clamping rings are adjustable along the optical axis of the objective. The housing is further surrounded by an internally threaded focusing ring which is in mesh with the housing and is provided with mounting elements for mounting the objective in a printer. The position of the housing in the printer can be varied by rotating the housing and the focusing ring relative to one another. This allows the objective to be focused following a change in magnification. Two additional clamping rings circumscribe the housing with one of the additional clamping rings being disposed on either side of the focusing ring. The additional clamping rings, which are again adjustable along the optical axis of the objective, function as abutments for the focusing ring.

42 Claims, 4 Drawing Sheets

ZOOM LENS SYSTEM FOR A PHOTOGRAPHIC COPIER

BACKGROUND OF THE INVENTION

The invention relates to a lens system.

The German patent 41 26 579 discloses a photographic copier or printer which is integrated in a so-called minilaboratory. Here, the photographic copier is incorporated in a unit which further includes a developing apparatus for photographic film and a developing apparatus for copy paper. Several units of this type, e.g., MSC 2, MSC 3 and MSC 101, are marketed by the assignee of the present application.

Customers of such minilaboratories generally wish to process different film formats and to produce copies of various sizes. It is therefore desirable to equip the copier with an objective of variable focal length. Furthermore, a change in magnification should be achievable simply and rapidly. To this end, electrically driven zoom objectives are employed. However, since objectives of this type are relatively complicated, they are relatively expensive.

A zoom objective for a copier is taught in the German publication 31 40 841 and has several lenses which are shiftable relative to one another in order to change the focal length. For focusing, the entire objective is displaced to a predetermined location between the object plane and the image plane. This objective again has the drawback of being electrically operated. Moreover, the objective has a relatively complicated cam drive.

Another zoom objective is known from the German publication 34 36 270 and comprises groups of lenses which are movable relative to one another and are also movable together between object plane and image plane. Abutments are provided for the lens groups and fix the range of adjustment of the objective. As before, the adjusting mechanism for the objective, which includes a cam drive for changing the magnification and/or the position of the objective, is relatively complicated.

SUMMARY OF THE INVENTION

It is an object of the invention to provide a lens system which enables lens movements to be achieved using a relatively economical design.

Another object of the invention is to provide a lens system which permits lens movements to be effected in a relatively simple manner.

An additional object of the invention is to provide a lens system which allows lens movements to be carried out relatively rapidly.

A further object of the invention is to provide a copier in which lens movements can be performed by way of a relatively inexpensive structure.

It is also an object of the invention to provide a copier in which lens movements can be achieved relatively simply.

Still another object of the invention is to provide a copier in which lens movements can be accomplished relatively rapidly.

The preceding objects, as well as others which will become apparent as the description proceeds, are achieved by the invention.

One aspect of the invention resides in a lens system, e.g., for use as an objective. The lens system comprises support means, first lens means on the support means, second lens means on the support means movable relative to the first lens means, and a pair of abutments for limiting displacement of the second lens means. At least one of the abutments, and advantageously each of the abutments, is shiftable between a plurality of locations of the support means. The support means can, for example, include a housing for the first and second lens means.

The first and second lens means may define an optical axis and the second lens means may then be shiftable along such axis. The lens system can comprise a moving device for shifting the second lens means relative to the first lens means and the abutments can here be disposed in the path of the moving device. The moving device is preferably mechanical.

A fundamental optical principle is that variable magnifications and ranges can be obtained using two lens means which are shiftable relative to one another. If the lens system of the invention is to be used in a photographic copier or printer, it is preferred for one of the lens means to be shiftable in the lens housing and for the other lens means to be fixed to the housing. The shiftable lens means can be displaceable along the optical axis between two end positions in a stepless fashion.

In a photographic copier, the spacing between image and object, i.e., the spacing between the copy material and a master to be reproduced, is constant. Therefore, when the magnification is changed, the entire lens system must be shifted along the optical axis in order to sharply focus the master in the plane of the copy material.

The lens system of the invention makes it possible to shift between two concrete magnifications, e.g., to produce an image of different size in the image plane or to convert to a different film format. To this end, the lens system includes a movable lens means and two abutments for limiting the displacement of the lens means. At least one of the abutments, and preferably both, are shiftable between a plurality of locations. The abutments are advantageously adjustable mechanically.

The shiftable abutments allow an operator of a copier to precisely set the lens system according to his or her individual requirements without difficulty. Hence, the area covered by the image in the image plane can be adjusted relatively easily to specific customer specifications. Furthermore, the format can be changed simply and rapidly.

The lens system may include a focusing arrangement. Here, it is of particular advantage to provide two abutments for the shiftable lens means and two abutments for the focusing arrangement. This makes it possible to very rapidly set the lens system at two discretionary magnifications which can be easily adjusted for individual customers.

Another aspect of the invention resides in a copier, especially a photographic copier or printer. The copier comprises a first arrangement for positioning masters at a first location, a second arrangement for positioning copy material at a second location, and a lens system for projecting images of masters from the first location to the second location. The lens system includes support means, first lens means on the support means, second lens means on the support means movable relative to the first lens means, and a pair of abutments for limiting displacement of the second lens means. At least one of the abutments is shiftable between a plurality of locations of the support means.

Additional features and advantages of the invention will be forthcoming from the following detailed description of preferred embodiments when read in conjunction with the accompanying drawings.

DESCRIPTION OF THE PREFERRED EMBODIMENTS

Figure 1:
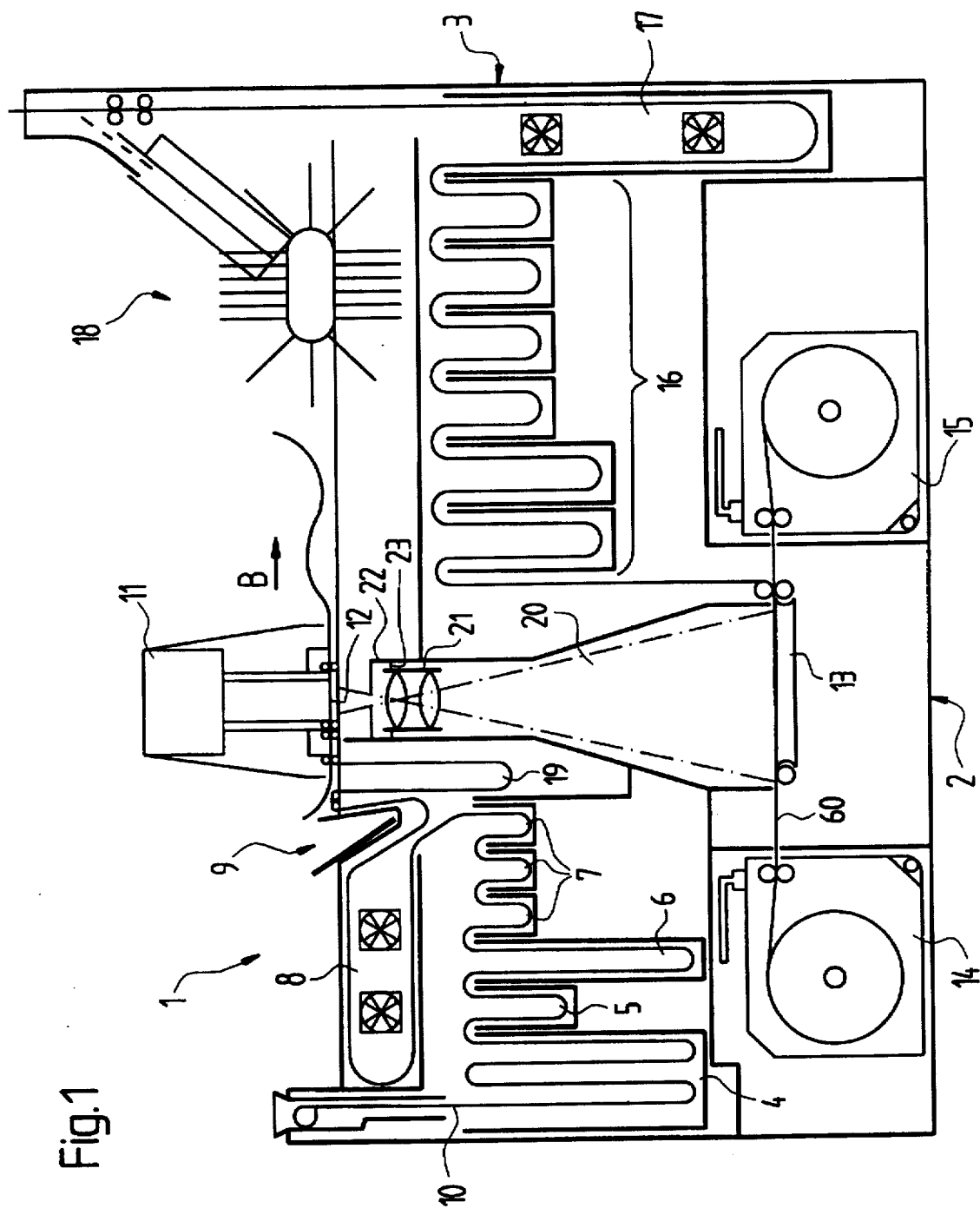
FIG. 1 illustrates a processing apparatus for photographic material.

Referring to FIG. 1, a processing apparatus for photographic material is shown. The processing apparatus is here a photographic minilaboratory in which a photographic finishing process is carried out. The photographic material to be processed in the minilaboratory is assumed to be an exposed strip of film 10 with a series of exposures.

The minilaboratory, which contains all of the components necessary for the production of photographic copies or prints, includes a developing unit 1 for film, a photographic copying or printing unit 2, and a developing unit 3 for copy material. The exposed film 10 is fed into the film developing unit 1 where the film 10 is conveyed through a container 4 which accommodates a developing bath for the film 10. The film 10 next passes through an intermediate container 5 in which the film 10 is washed. Downstream of the intermediate container 5 is a container 6 with a bleach fixing bath. Following fixing, the film 10 travels through several containers 7 for a final wash.

After the final wash, the film 10 is dried with warm air in a dryer 8. Upon exiting the dryer 8, the film 10 is transported to a film transfer station 9.

The developed film 10 contains a series of frames or masters which are to be reproduced. To this end, the developed film 10 is introduced into the copying unit 2 from the film transfer station 9. The copying unit 2 includes an intermediate or temporary storage section 19 which compensates for the different speeds of the film 10 in the film developing unit 1 and the copying unit 2.

Films which have been developed elsewhere can be fed directly into the copying unit 2 from the transfer station 9.

From the storage section 19, the film 10 enters a copying or printing station where the film 10 travels over a platform or support 12 on which a frame to be reproduced is positioned. The film 10 makes two passes through the copying station. During the initial pass, the film 10 is transported away from the transfer station 9 in the direction of the arrow B. As the film 10 moves in the direction B, the film 10 is scanned point-by-point via a non-illustrated scanner. The data obtained from the scanning operation is used to calculate exposure data for the frames of the film 10.

Once the entire film 10 has been scanned, the film 10 is conveyed through the copying station in the opposite direction from before, i.e., counter to the direction B. Each frame of the film 10 is now imaged onto copy material 60 using the previously calculated exposure data. Imaging of the frames is performed by means of an illuminating unit 11 and a lens system 21 constructed in accordance with the invention. The illuminating unit 11 is arranged to illuminate a frame positioned on the platform 12, and the lens system 21 constitutes an objective which projects and sharply focuses an image of the frame on the copy material 60.

The lens system 21 is located in a light shaft 20 of the copying unit 2. The copying unit 2 has a housing which includes a mounting section 22, and the lens system 21 is fixed to the mounting section 22 by a bayonet coupling 23.

The film 10 is conveyed through the copying station by transporting rollers which are illustrated but not specifically referenced. These transporting rollers constitute, or constitute part of, an arrangement for positioning the frames of the film 10 at a predetermined location 12 of the copying unit 2.

The copy material 60 is here assumed to be photographic color negative paper. Unexposed copy material 60 is unwound from either of two cassettes 14 and 15 and thereupon transported into the copying station. In the copying station, the copy material 60 passes over a platform or support 13 where the copy material 60 is exposed.

Following exposure, the copy material 60 enters the developing unit 3 for copy material. Here, the copy material 60 travels through a series of containers 16 which accommodate chemical processing baths and washing baths. Upon leaving the containers 16, the copy material 60 is dried in a dryer 17 and cut into individual copies or prints. The finished copies exit the minilaboratory 1–3 via a discharge and collecting device 18.

The copy material 60 is passed through the copying station by transporting rollers which are illustrated but not specifically referenced. Such transporting rollers constitute, or constitute part of, an arrangement for positioning successive unexposed segments of the copy material 60 at a predetermined location 13 of the copying unit 2.

Figure 2:
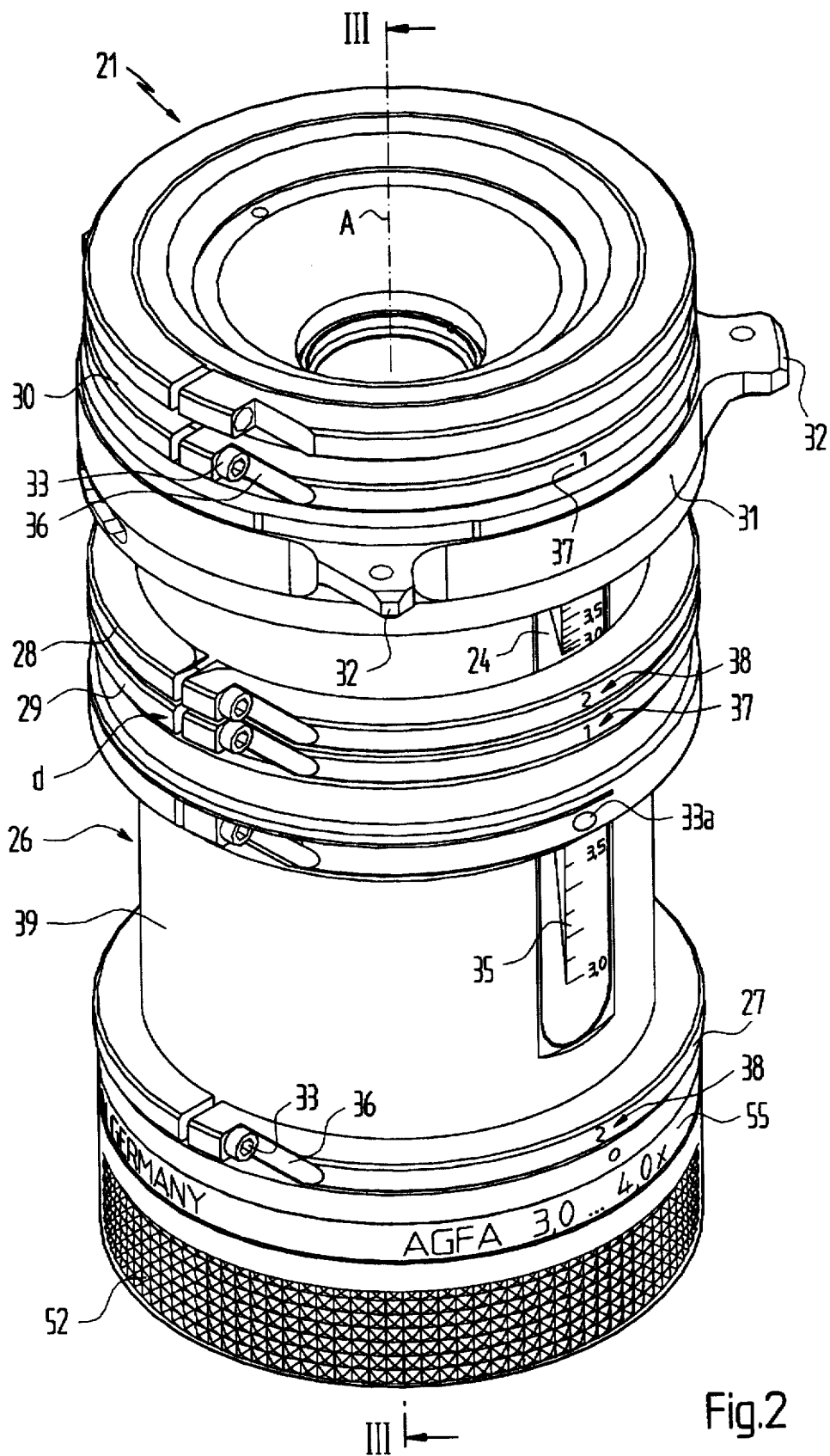
FIG. 2 shows a lens system constituting part of the processing apparatus of FIG. 1.
Figure 3:
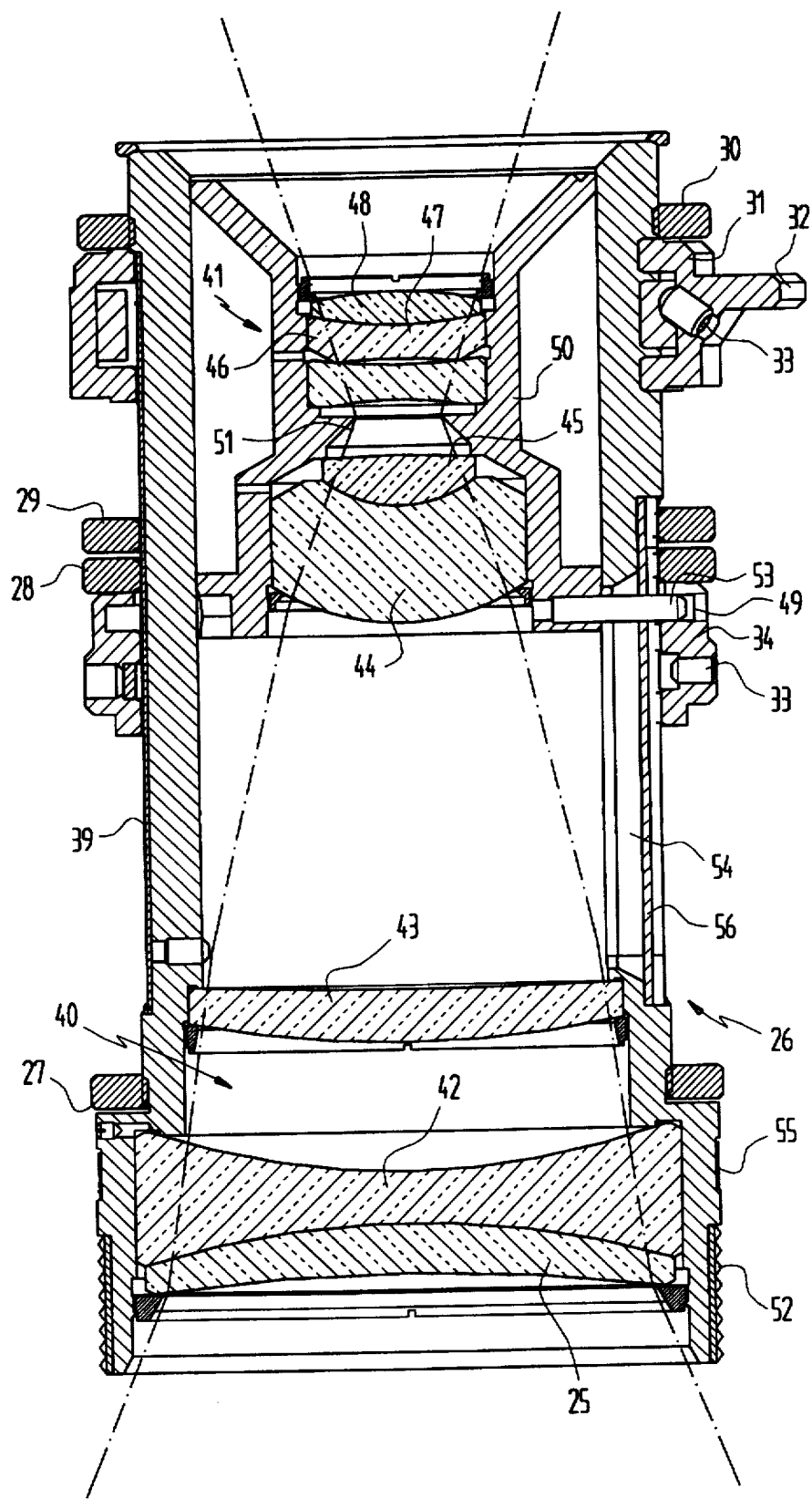
FIG. 3 is a sectional view of the lens system as seen in the direction of the arrows III—III of FIG. 2.

In FIGS. 2 and 3, the lens system 21 of the invention is shown in some detail. The lens system 21 includes a housing or support 26 which accommodates a lens means or group of lenses 40 and another lens means or group of lenses 41. The lens group 40 and lens group 41 have a common optical axis A which constitutes the optical axis of the lens system 21.

The lens group 40 has negative refractive power and includes three lenses 25, 42 and 43 which are fixed to the housing 26. On the other hand, the lens group 41 has positive refractive power and comprises five lenses 44, 45, 46, 47 and 48. The lenses 44–48 are mounted on a holder 50 which is provided with a stop 51 and is shiftable back-and-forth along the optical axis A.

A knurled rubber ring 52 is mounted on the housing 26 and is arranged to face the copy material platform 13 when the lens system 21 is installed in the copying unit 2. Next to the knurled ring 52 is a recording ring 55 with characteristic data of the lens system 21. The lens system 21 here has a magnification which varies from 3.0 to 4.0 at an object-to-image distance of 700 mm. Thus, the lens system 21 may be considered to constitute a zoom lens.

The housing 26 is provided with external threads 39. A carrier ring or magnification ring 34 is threaded onto the housing 26 and has internal threads 34a which mesh with the external threads 39 of the housing 26. The carrier ring 34 serves to move the lens group 41 along the optical axis A. To this end, the carrier ring 34 is connected to the holder 50 by a pin 53. The pin 53 is guided in an open groove 54 formed in the housing 26. The groove 54 is shielded from dust by a slotted rubber seal 56.

Two additional rings 27 and 28 are present on the outside of the housing 26. The rings 27, 28 are spaced from one another along the optical axis A and constitute abutments for the carrier ring 34. The abutment rings 27, 28 function to limit displacement of the lens group 41 along the optical axis A. If desired, the abutment rings 27, 28 can be provided with respective threads 27a, 28a which mesh with the external threads 39 of the housing 26.

When the lens group 41 is moved by means of the carrier ring 34, the focal length, and hence the magnification, of the lens unit 21 changes. A scale 35 is provided on the outside of the housing 26, and the instantaneous magnification of the lens system 21 can be read from the position of the carrier ring 34 on the scale 35. The carrier ring 34 has a colored side which is positioned adjacent the desired magnification on the magnification scale 35.

A focusing ring 31 is threaded onto the housing 26 and has internal threads 31a which mesh with the external threads 39 of the housing 26. The focusing ring 31, which is located on the side of the abutment ring 28 remote from the carrier ring 34, makes it possible to vary the position of the lens system 21 within the copying unit 2 in the direction of the optical axis A. In this manner, the focusing ring 31 allows a sharp image of a master to be formed in the plane of the copy material platform 13 for any given magnification. To assist in focusing, a focusing scale 24 is formed on the outside of the housing 26 and is marked with the different magnifications of the lens system 21. For a particular magnification, the lens system 21 is focused by positioning the focusing ring 31 so that the side thereof facing the abutment ring 28 is at the corresponding mark of the focusing scale 24. This side of the focusing ring 31 can be white.

Two more rings 29 and 30 are mounted on the outside of the housing 26. The rings 29, 30 are spaced from one another along the optical axis A and constitute abutments for the focusing ring 31. The abutment rings 29, 30 function to confine the focusing ring 31 in the direction of the optical axis A. If desired, the abutment rings 29, 30 can be provided with respective threads 29a, 30a which mesh with the external threads 39 of the housing 26.

Nose-like projections 32 are formed on the outside of the focusing ring 31. The projections 32 constitute bayonet coupling elements and form part of the bayonet coupling 23. A selected one of the projections 32 has a mark which facilitates insertion of the lens system 21 in the copying unit 2. Although the bayonet coupling 23 permits the lens system 21 to be introduced into the copying unit 2 in only one orientation, the mark on the selected projection 32 allows the lens system 21 to be precisely located in a predetermined position within the copying unit 2. The bayonet coupling 23 serves to lock the lens system 21 in the copying unit 2. It may be seen that the focusing ring 31 serves as a mounting member for mounting the lens system 21 in the copying unit 2.

The abutment rings 27–30 are all movable on the housing 26 along the optical axis A. The abutment rings 27–30 are all in the form of clamping rings. Thus, each of the abutment rings 27–30 includes a split ring having a pair of free ends which confront one another and are separated by a gap of width d. Clamping screws or arresting portions 33 are threaded into the free ends of the abutment rings 27–30 and are arranged to move the free ends of each abutment ring 27–30 towards and away from each other. This changes the width d of the gaps between the free ends of the abutment rings 27–30, and hence the inner diameters of the abutment rings 27–30. The clamping screws 33 serve as adjusting members and function to clamp the abutment rings 27–30 on the housing 26. Cutouts 36 are formed in the free ends of the abutment rings 27–30 in order to facilitate access to the clamping screws 33 with a screwdriver or similar tool. Set screws 33a are provided to clamp the carrier ring 34 and focusing ring 31 to the housing 26.

The lens system 21 can be configured in any manner within its adjustment range in accordance with the requirements of an operator. To achieve a particular magnification, a coarse adjustment of the magnification is initially made. This is accomplished by loosening the set screw 33a of the carrier ring 34 and thereupon rotating the carrier ring 34 until the colored side of the carrier ring 34 is positioned at the desired magnification on the magnification scale 35. If one of the abutment rings 27, 28 interferes with rotation of the carrier ring 34, such abutment ring 27 or 28 is unclamped from the housing 26 and moved. Once the carrier ring 34 is in the proper position, the set screw 33a of the carrier ring 34 is tightened to fix the carrier ring 34.

This is followed by a coarse adjustment of the focus. To this end, the set screw 33a of the focusing ring 31 is loosened. The focusing ring 31 is then rotated to bring the white side of the focusing ring 31 adjacent the magnification on the focusing scale 24 corresponding to the magnification previously set by the carrier ring 34.

For fine adjustment of the magnification, the lens system 21 is placed in the copying unit 2. A test negative or a so-called cover template is placed on the master platform 12, and an image of the test negative or cover template is formed on the copy material platform 13. By loosening and slightly rotating the carrier ring 34, the area of the copy material platform 13 covered by the image can be optimally adjusted. Once the desired adjustment has been obtained, the carrier ring 34 is clamped. Following rotation of the carrier ring 34, it may be necessary to perform a fine adjustment of the focus in the same manner as described for the magnification.

The adjustment rings 27–30 can be used to preset the lens system 21 to two predetermined magnifications at which the lens system 21 is focused. This allows the lens system 21 to be rapidly switched between two different magnifications, i.e., the copying unit 2 can be very quickly changed from one of two different print formats to the other.

To preset the lens system 21 to two predetermined magnifications, one of the magnifications is first fixed as described above, i.e., the carrier ring 34 and focusing ring 31 are respectively clamped in the positions corresponding to one of the desired magnifications. A determination must be made as to whether this magnification is the higher or the lower of the predetermined magnifications. Assuming that the first magnification to be set is the higher magnification, the abutment ring 28 is brought into contact with the carrier ring 34 once the latter has been appropriately positioned for the higher magnification. Similarly, the abutment ring 30 is placed contiguous to the focusing ring 31 after the focusing ring 31 has been brought into a position corresponding to the higher magnification. The abutment rings 28, 30 are then clamped to the housing 26 thereby presetting the lens system 21 to the higher magnification. The same procedure is followed for the lower magnification except that now the abutment rings 27, 29 are brought into contact with the carrier ring 34 and the focusing ring 31 when the rings 34, 31 are in the positions associated with the lower magnification.

It is of advantage for the abutment rings 28, 30, which are used in setting higher magnifications, to be formed with the same identifying characteristic 37. The abutment rings 27, 29, which are used to set lower magnifications, likewise are favorably provided with a common identifying characteristic 38. By way of example, the identifying characteristics 37, 38 are illustrated as being numerals. However, the identifying characteristics 37, 38 could also take other forms such as colors.

Figure 4:
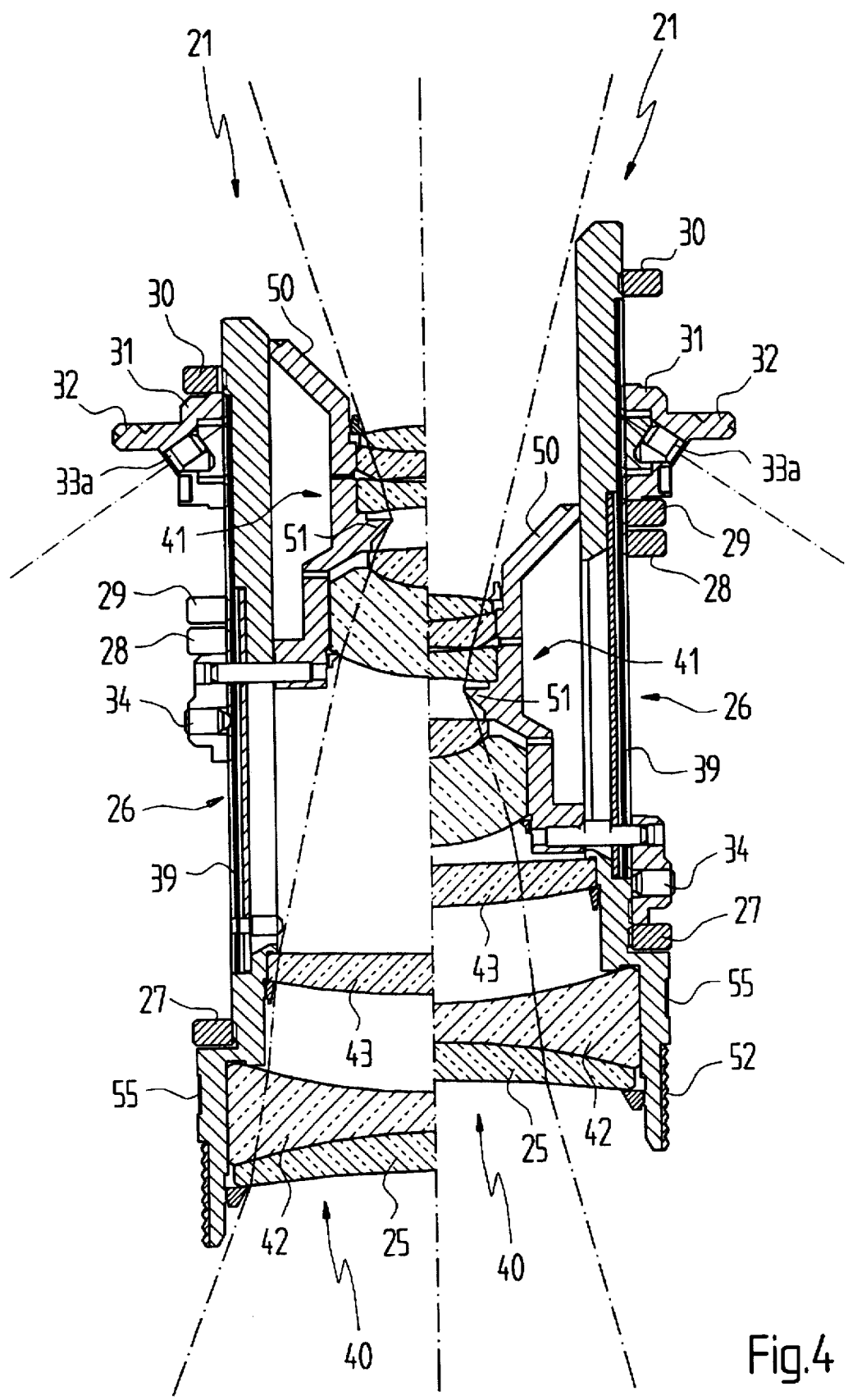
FIG. 4 illustrates the lens system set to two different magnifications.

FIG. 4 shows the lens system 21 at two different magnifications. The left-hand side of FIG. 4 illustrates the condition of the lens system 21 at its maximum magnification while the right-hand side of FIG. 4 shows the condition of the lens system 21 at its minimum magnification. In the two parts of FIG. 4, the projections 32 of the focusing ring 31 are at the same location along the optical axis A of the lens system 21. It may be seen that the housing 26 assumed different positions along the optical axis A at different magnifications. This makes it possible to change the magnification and nevertheless achieve a sharp focus with a fixed object-to-image distance.

Although the invention has been described with reference to a preferred embodiment, many modifications are conceivable within the meaning and range of equivalence of the appended claims. For instance, the abutment rings 27–30 can be movably mounted on the housing 26 by means other than threads. Thus, the threads 27a, 28a, 29a, 30a could be omitted so that the abutment rings 27–30 are freely displaceable along the housing 26 when the clamping screws 33 are loosened. The advantages of the invention are maintained, including the ability to rapidly convert the lens system 21 from either of two discretionary magnifications to the other while keeping a sharp focus.

I claim:

1. A lens system, comprising support means; a mounting member for said support means, said mounting member being shiftable between a plurality of locations of said support means, and said support means being provided with first threads, said mounting member being provided with second threads which mesh with said first threads; first lens means on said support means; second lens means on said support means movable relative to said first lens means; and a pair of abutments for limiting displacement of said second lens means, at least one of said abutments being shiftable between a plurality of locations of said support means.

2. The system of claim 1, wherein each of said abutments is shiftable between a plurality of locations of said support means.

3. The system of claim 1, wherein said support means comprises a housing for said first and second lens means.

4. The system of claim 1, wherein said mounting member is generally annular.

5. A lens system, comprising support means; a mounting member for said support means, said mounting member being shiftable between a plurality of locations of said support means, and at least one of said support means and said mounting member including an arresting portion for fixing said mounting member on said support means; first lens means on said support means; second lens means on said support means movable relative to said first lens means; and a pair of abutments for limiting displacement of said second lens means, at least one of said abutments being shiftable between a plurality of locations of said support means.

6. A lens system, comprising support means; a mounting member for said support means, said mounting member being shiftable between a plurality of locations of said support means, and said mounting member including at least one bayonet coupling element; first lens means on said support means; second lens means on said support means movable relative to said first lens means; and a pair of abutments for limiting displacement of said second lens means, at least one of said abutments being shiftable between a plurality of locations of said support means.

7. A lens system, comprising support means; a mounting member for said support means, said mounting member being shiftable between a plurality of locations of said support means; a pair of abutment members for limiting displacement of sale mounting member, at least one of said abutment members being shiftable between a plurality of locations of said support means; first lens means on said support means; second lens means on said support means movable relative to said first lens means; and a pair of abutments for limiting displacement of said second lens means, at least one of said abutments being shiftable between a plurality of locations of said support means.

8. The system of claim 7, wherein each of said abutment members is shiftable between a plurality of locations of said support means.

9. The system of claim 7, wherein one of said abutments and one of said abutment members have a common identifying characteristic.

10. A copier, comprising a first arrangement for positioning masters at a first location; a second arrangement for positioning copy material at a second location; and a lens system for projecting images of masters from said first location to said second location, said lens system including support means, a mounting member for said support means, first lens means on said support means, second lens means on said support means movable relative to said first lens means, and a pair of abutments for limiting displacement of said second lens means, said mounting member and at least one of said abutments being shiftable between a plurality of locations of said support means, and said support means being provided with first threads, said mounting member being provided with second threads which mesh with said first threads.

11. The copier of claim 10, wherein each of said abutments is shiftable between a plurality of locations of said support means.

12. The copier of claim 10 wherein said support means comprises a housing for said first and second lens means.

13. The copier of claim 10, wherein said mounting member is generally annular.

14. A copier, comprising a first arrangement for positioning masters at a first location; a second arrangement for positioning copy material at a second location; and a lens system for projecting images of masters from said first location to said second location, said lens system including support means, a mounting member for said support means, first lens means on said support means, second lens means on said support means movable relative to said first lens means, and a pair of abutments for limiting displacement of said second lens means, said mounting member and at least one of said abutments being shiftable between a plurality of locations of said support means, and at least one of said support means and said mounting member including an arresting portion for fixing said mounting member on said support means.

15. A copier, comprising a first arrangement for positioning masters at a first location; a second arrangement for positioning copy material at a second location; and a lens system for projecting images of masters from said first location to said second location, said lens system including support means, a mounting member for said support means, first lens means on said support means, second lens means on said support means movable relative to said first lens means, and a pair of abutments for limiting displacement of said second lens means, said mounting member and at least one of said abutments being shiftable between a plurality of locations of said support means, and said mounting member including at least one bayonet coupling element.

16. A copier, comprising a first arrangement for positioning masters at a first location; a second arrangement for positioning copy material at a second location; and a lens system for projecting images of masters from said first location to said second location, said lens system including support means, a mounting member for said support means, a pair of abutment members for limiting displacement of said mounting member, first lens means on said support means, second lens means on said support means movable relative to said first lens means, and a pair of abutments for limiting displacement of said second lens means, said mounting member and at least one of said abutment members, as well as at least one of said abutments, being shiftable between a plurality of locations of said support means.

17. The copier of claim 16, wherein each of said abutment members is shiftable between a plurality of locations of said support means.

18. The copier of claim 16, wherein one of said abutments and one of said abutment members have a common identifying characteristic.

19. A lens system, comprising support means; first lens means on said support means; second lens means on said support means movable relative to said first lens means; and a pair of abutments for limiting displacement of said second lens means, said abutments being shiftable between a plurality of locations of said support means, and said support means including housing means for said first and second lens means, said abutments being movable on said housing means along an axis.

20. The system of claim 19, further comprising a moving device for shifting said second lens means relative to said first lens means.

21. The system of claim 20, wherein said moving device is mechanical.

22. The system of claim 19, wherein said first and second lens means have an optical axis and said second lens means is shiftable along said optical axis.

23. The system of claim 19, wherein said support means is provided with first threads and said one abutment is provided with second threads which mesh with said first threads.

24. The system of claim 23, wherein said one abutment is generally annular.

25. The system of claim 19, wherein at least one of said support means and said one abutment comprises an arresting portion for fixing said one abutment on said support means.

26. The system of claim 25, wherein said one abutment comprises a split ring having two ends, said arresting portion including an adjusting member for shifting said ends relative to one another so as to clamp said ring on said support means.

27. The system of claim 26, wherein said adjusting member comprises a screw which engages said ends.

28. The system of claim 19, further comprising a mounting member for said support means, said mounting member being shiftable between a plurality of locations of said support means.

29. The system of claim 28, wherein said first and second lens means have an optical axis and said mounting member is shiftable along said optical axis.

30. The system of claim 19, wherein said axis coincidences with the optical axis of said lens system.

31. A copier, comprising a first arrangement for positioning masters at a first location; a second arrangement for positioning copy material at a second location; and a lens system for projecting images of masters from said first location to said second location, said lens system including support means, first lens means on said support means, second lens means on said support means movable relative to said first lens means, and a pair of abutments for limiting displacement of said second lens means, said abutments being shiftable between a plurality of locations of said support means, and said support means including housing means for said first and second lens means, said abutments being movable on said housing means along an axis.

32. The copier of claim 31, wherein said axis coincides with the optical axis of said lens system.

33. The copier of claim 31, wherein said lens system further includes a moving device for shifting said second lens means relative to said first lens means.

34. The copier of claim 33, wherein said moving device is mechanical.

35. The copier of claim 31, wherein said first and second lens means have an optical axis and said second lens means second lens means have an optical axis and said mounting member is shiftable along said optical axis.

36. The copier of claim 31, wherein said support means is provided with first threads and said one abutment is provided with second threads which mesh with said first threads.

37. The copier of claim 36, wherein said one abutment it generally annular.

38. The copier of claim 31, wherein at least one of said support means and said one abutment comprises an arresting portion for fixing said one abutment on said support means.

39. The copier of claim 38, wherein said one abutment comprises a split ring having two ends, said arresting portion including an adjusting member for shifting said ends relative to one another so as to clamp said ring on said support means.

40. The copier of claim 39, wherein said adjusting member comprises a screw which engages said ends.

41. The copier of claim 31, wherein said lens system further includes a mounting member for said support means, said mounting member being shiftable between a plurality of locations said support means.

42. The copier of claim 41, wherein said first and second lens means have an optical axis and said mounting member is shiftable along said optical axis.

* * * * *